United States Patent [19]
Jackson

[11] 3,968,568
[45] July 13, 1976

[54] ENCODER ERROR CORRECTION MEANS FOR USE WITH A DISTANCE MEASURING WHEEL

[75] Inventor: Bobby R. Jackson, Houston, Tex.

[73] Assignee: AMF Incorporated, White Plains, N.Y.

[22] Filed: July 10, 1974

[21] Appl. No.: 487,184

[52] U.S. Cl. ............................. 33/141 G; 235/96
[51] Int. Cl.² ..................... G01B 3/12; G01B 7/04; G01C 22/00
[58] Field of Search ............ 33/141 R, 141 B, 141 E, 33/141 G, 141.5, 142; 235/96

[56] References Cited
UNITED STATES PATENTS

| | | | |
|---|---|---|---|
| 2,362,616 | 11/1944 | Cloud | 33/141.5 |
| 2,885,787 | 5/1959 | Gray et al. | 33/141 B |
| 2,983,517 | 5/1961 | Klein | 274/23 R |
| 3,134,175 | 5/1964 | Potts | 33/141 G |

Primary Examiner—Richard E. Aegerter
Assistant Examiner—Steven L. Stephan
Attorney, Agent, or Firm—George W. Price; John H. Gallagher

[57] ABSTRACT

In the use of a rotatable wheel and a rotation sensing device such as an incremental shaft encoder to measure the longitudinal translation of one member relative to another which extends longitudinally, for example, and wherein the wheel is supported for rotation on the longitudinally extending member by means of an inclined pivot arm supported on the one member, means are provided to automatically adjust the angular position of the stator portion of the shaft encoder to compensate for rotation of the wheel when the lateral spacing between the two relatively movable members changes, thereby eliminating a false indication of longitudinal translation.

10 Claims, 8 Drawing Figures

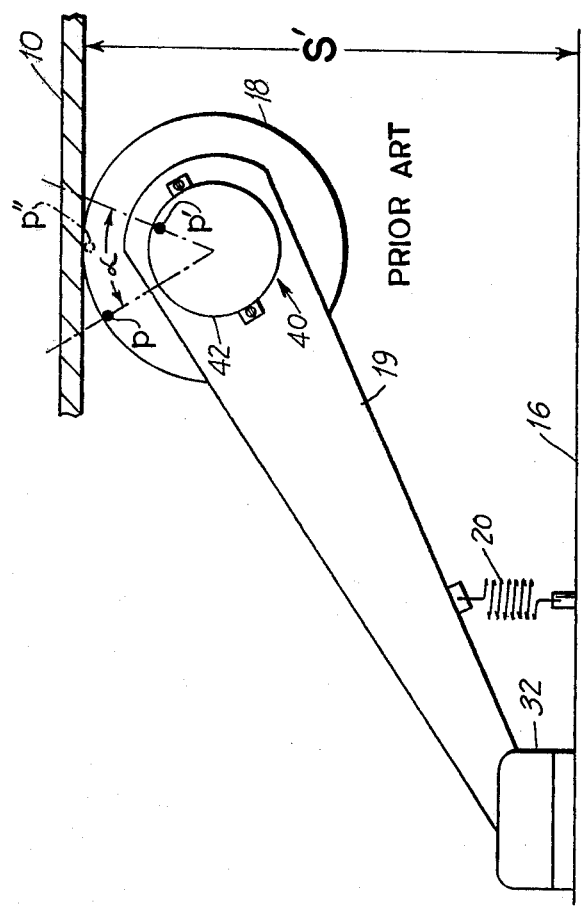
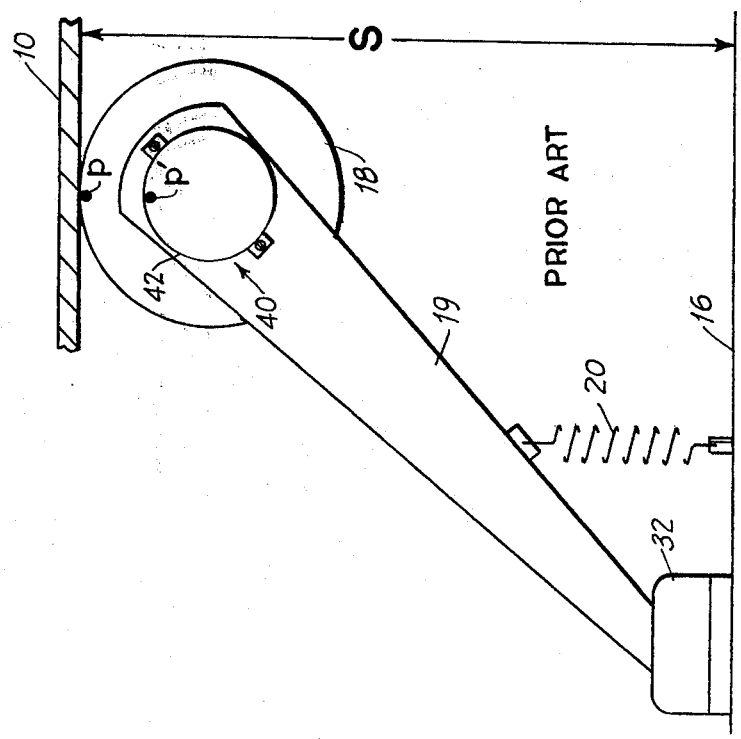

ENCODER ERROR CORRECTION MEANS FOR USE WITH A DISTANCE MEASURING WHEEL

BACKGROUND OF THE INVENTION

In the nondestructive inspection of objects by the use of some types of magnetic, electromagnetic and radioactive inspection apparatus, the apparatus produces electrical inspection signals which indicate a condition or property of the object being inspected. It is common practice to record the inspection signals on a recording medium such as a magnetic tape and/or on a strip chart. When inspecting elongated objects such as lengths of tubular goods, long sheets of metal, and pipelines, for example, it is desirable also to provide signals in response to the relative movement of the inspecting apparatus and the object so that the inspection signals may be correlated on the record to the exact distance along the object where the signals were produced. For very precise and very rapid inspection procedures it is necessary that the indication of relative motion between the inspection apparatus and the object, i.e., the distance one moves along the other, be correlated as accurately as possible in incremental units to the exact times of occurrence of the inspection signals.

In the case of a pipeline inspection pig traveling through a pipeline being nondestructively inspected by apparatus carried by the pig, the distance of travel of the pig is measured by measuring the rotation of a wheel which is carried by the pig and urged into rolling contact with the wall of the pipeline. Because the inspection pig must pass over and through obstructions and irregularities such as valves, couplings to branch lines, weld "icicles" within the pipeline, mashes and dents in the pipe wall, it is common practice to mount the rotatable measuring wheel at the end of a pivot arm that is inclined with respect to the wall of the pipeline. A spring acting on the pivot arm resiliently urges the wheel into contact with the pipe wall and permits the wheel to pass over and through the obstructions without damage.

Another use of rotating distance measuring wheels resiliently urged into rolling contact with the pipeline wall is in apparatus for measuring the curvature of a pipeline, as disclosed in U.S. Pat. No. 3,882,606 entitled: "Method and Apparatus for Measuring Curvature and Curvature Variations in Pipelines and the Like", issued to R. Kaenel et al. In that patent, pipeline curvature measurement is based on the fact that for a curved path having a finite width, the distance along the boundary of the path having the greater radius of curvature is greater than the distance along the other boundary of the curved path. Based on this fact, various ones of an array of measuring wheels carried by a pipeline pig and arranged in a given configuration around the inner wall of a pipeline will travel different distances when passing through a section of curved pipe. By measuring the rotations of the various wheels along successive incremental lengths of the pipeline, sufficient data may be obtained to calculate the curvature of the pipe. As in the previous example, digital shaft encoders, sometimes called incremental shaft encoders, attached to the wheel axles are used to measure the rotations of the wheels.

As is well understood, a digital shaft encoder is comprised of a housing portion which functions as a stator member, and a rotating shaft portion which is coupled to a member whose rotation is to be measured. A coded disc is attached to and rotates with the rotor member, and suitable means are mounted on the stator portion to detect the movement of the coded disc past some reference position on the stator.

In the conventional use of a digital shaft encoder on the axle of a measuring wheel of the types described above, the stator portion is mounted on and fixed with respect to the pivot arm which supports the axle. This is the customary way to mount and use a digital shaft encoder. It has been discovered, however, that when attempting to make precise distance measurements over short distances such as several feet of travel of a pipeline pig, unexpected errors were detected in the output readings of the digital shaft encoders. As will be explained in more detail below, the errors were discovered to result from changes in the angle of inclination of the pivot arm that supports the measuring wheel and to which the stator portion of the digital shaft encoder was attached. In practice it was found that the angle of inclination of the wheel supporting pivot arm did in fact experience considerable change as the inspection pig moved through a pipeline. This was caused by mashes and dents in the wall of the pipeline which push the wheel and pivot arm inwardly and by the lateral movement of the pig from the exact center of the pipeline.

It therefore is an object of this invention to provide a method and apparatus for using a rotation measurement device on a measurement wheel carried by a pipeline pig to provide an accurate measurement of the distance the pig moves in the pipeline.

BRIEF DESCRIPTION OF THE DRAWINGS

The invention will be described by referring to the accompanying drawings wherein:

FIGS. 4 and 5 are simplified illustrations of prior art rotation measurement apparatus which are referred to in explaining the nature of the error which is corrected by use of the present invention.

DESCRIPTION OF PREFERRED EMBODIMENT

Figure 1:
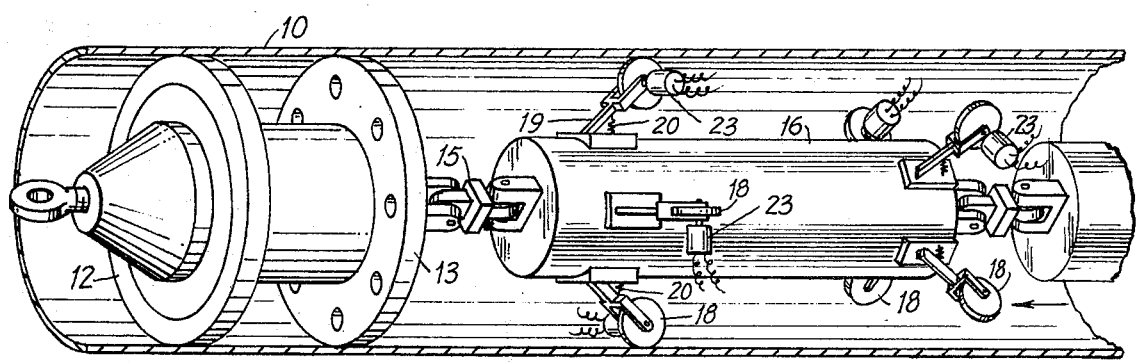
FIG. 1 is a simplified illustration of apparatus in which the present invention may be employed.

Referring now in detail to the drawings, FIG. 1 is a simplified illustration of but one instance where the present invention may be used. In this example, an instrumented pipeline pig is passed through a section of pipeline 10 for measuring the curvature in the pipeline. The pig includes a propelling section on the left which is comprised of resilient cups 12 and 13 which slide along the inside wall of the pipeline and which are propelled to the left by the force exerted by the fluid being transported through the pipeline. The propelling section is connected by a universal joint 15 to a following section 16 which has mounted thereon a plurality of wheels 18 which are urged into rolling contact with the wall of pipe 10. Wheels 18 are mounted at the ends of respective inclined arms 19 which are pivotally attached to the exterior portion of trailing section 16. Suitable spring means 20 urge pivot arm 19 outwardly to maintain wheels 18 in contact with the pipe wall and also to serve as centering means to cause the trailing section to maintain a generally centered position within the pipe.

Associated with each wheel 18 is a rotation sensing or pickoff device 23 having a rotary portion which rotates as the wheel rotates, and a stator portion which includes means for producing a signal that indicates rotation of the rotor relative to a reference position on the stator portion. A model ON 25-2000 Optecon incremental shaft encoder sold by Data Technology, Inc., 65 Grove Street, Watertown, Massachusetts 02172 is a suitable rotation sensing device. The output signal of such a device is a digitally coded signal.

One use for the apparatus just described is in the measurement of pipeline curvature as taught in the above-identified patent. However, the present invention is useful in other applications where precise incremental distance measurements are to be made by means of a rotating wheel mounted on a pivot arm that is inclined relative to the path of relative movement of two members. Accordingly, for purpose of simplifying this description, the following discussion will deal with the invention in its basic form as embodied in a single measuring wheel.

Figure 2:
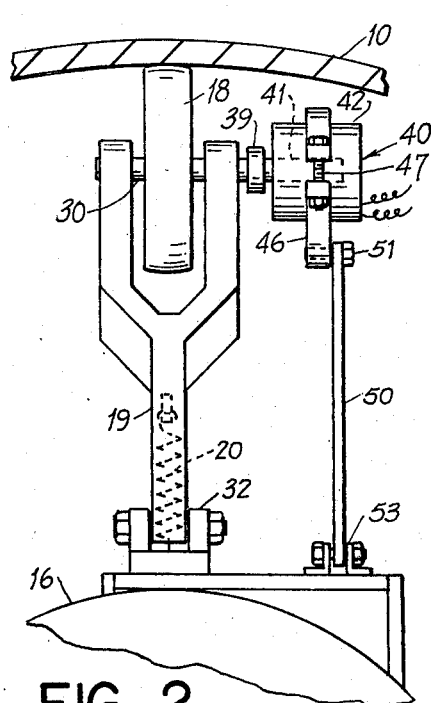
FIGS. 2, 3 and 6 are simplified illustrations of rotation measurement apparatus incorporating the present invention.
Figure 3:
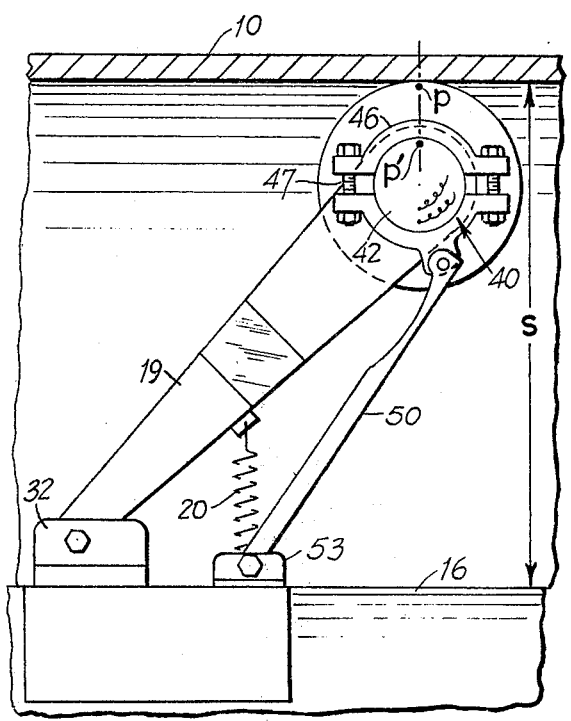

In FIGS. 2 and 3 the axle 30 of measuring wheel 18 is secured to and rotates with the wheel 18 by means of bushings in the two arms at the forked end of pivot arm 19. As illustrated in FIG. 3, spring 20 urges pivot arm 19 outwardly to maintain wheel 18 in rolling contact with the wall of pipe 10. The bottom end of pivot arm 19 is pivotally attached to a base comprised of mounting bracket 32 which is attached to the body 16 of a pipeline inspection pig, for example.

An incremental shaft encoder 40 which may be of the type described above has its rotor 41 coupled to axle 30 of wheel 18 by means of a suitable coupling means 39 so that rotor portion 41 rotates with axle 30. Unlike the common usage of a shaft encoder, the housing or stator portion 42 of shaft encoder 40 is not attached to the fixed support for axle 30, but instead, stator portion 42 is spaced from and unattached to the forked end of pivot arm 19. A rigid split ring 46 is disposed about the stator portion of encoder 40 and is fixedly attached thereto by means of fasteners such as nuts and bolts 47 which hold the two halves of the split ring 46 in tight engagement with stator 42.

A crank arm 50 has its upper end pivotally attached to split ring 46 by means of bolt 51 and its lower end pivotally attached to a bracket 53 that is secured to the body 16 of the pipeline pig. As an alternative arrangement, it may be desirable to provide on stator portion 42 means for pivotally connecting crank arm 50 directly thereto, rather than employing a split ring 46.

The present invention will be better understood by first examining the nature of the error that occurs when the stator portion 42 of shaft encoder 40 is fixedly attached to pivot arm 19, which is the conventional way to mount and use such a device. Referring to FIG. 4, the pipeline wall 10 and body portion 16 of the pig are illustrated in what may be considered their nominal or usual spacing S. Wheel 18 contacts the pipe wall at a point $p$ on the wheel. A fixed reference point $p'$ on the stator member 42 of shaft encoder 40 is in vertical alignment with point $p$. Assume now for the purpose of explanation that there has been no horizontal movement between the pig body 16 and pipe wall 10 and that wheel 18 remains in contact with the pipe wall 10. Assume also that for some reason the spacing between the wall 10 and the pig body 16 gradually decreases to the distance $S'$, as in FIG. 5. In practice, such a decrease in spacing may result from the pig body 16 moving radially away from the center of the pipeline, or may be caused by a dent or depression in the wall of the pipeline which pushes wheel 18 and pivot arm 19 inwardly. Because the pipe wall 10 and pig body 16 now are closer together, pivot arm 19 is inclined at a smaller angle to the body of the pig. The clockwise rotation of pivot arm 19 causes the point $p'$ on stator 42 to move in space clockwise relative to its former position in FIG. 4, and additionally causes the point of contact of wheel 18 with wall 10 to change so as to cause the point $p$ on wheel 18 to move counterclockwise relative to its former position in FIG. 4. Wheel 18 now contacts wall 10 at a new position $p''$. It may be seen in FIG. 5 that the points $p$ and $p'$ now are angularly displaced by the angle $\alpha$ rather than being in vertical alignment as in FIG. 4. This angular displacement $\alpha$ causes a change in the output of shaft encoder 40 and gives rise to a false indication that relative horizontal movement has occurred between the base, or pig body 16, and pipe wall 10.

Figure 6:
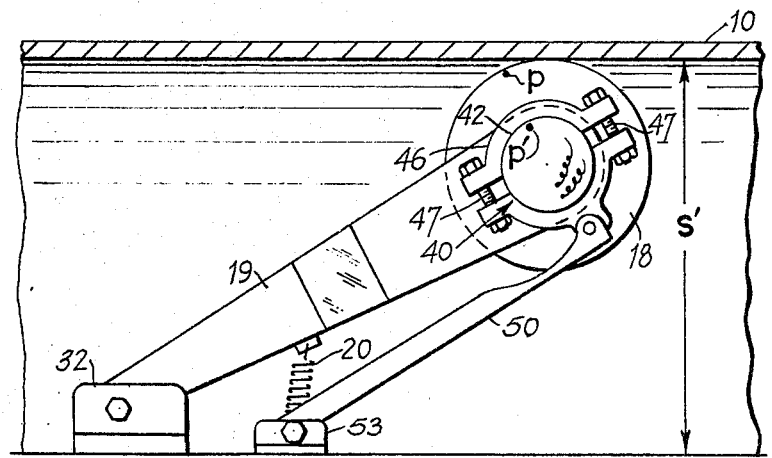

The manner in which the present invention operates to compensate for and correct the error described above will be explained by referring to FIGS. 2, 3 and 6. It is seen that the rotor 41 of incremental shaft encoder 40 is attached to and rotates with axle 30, but the housing or stator portion 42 of the encoder is unattached to pivot arm 19 and is free to rotate with respect thereto. The angular position of the stator portion 42 is determined by a geometrical relationship that includes the length and angle of inclination of pivot arm 19, the length and angular inclination of crank arm 50, and the locations where crank arm 50 is coupled to base 16 and stator portion 42. By comparing FIGS. 3 and 6 it will be seen that when the spacing S between the pig body 16 and pipe wall 10 decreases to the smaller distance $S'$, the angles of inclination of pivot arm 19 and crank arm 50 both decrease. However, crank arm 50, being rigid and of a fixed length, imparts a counterclockwise rotation to the encoder housing or stator portion 42. The geometry of the apparatus has been so constructed and arranged, as will be explained, that as the angle of inclination of pivot arm 19 decreases the counterclockwise rotation imparted to the stator portion 42 by crank arm 50 is substantially equal in magnitude to the counterclockwise rotation experienced by wheel 18 and is in the proper direction to cause the fixed reference point $p'$ on the stator portion 42 to remain radially aligned with the rotated point $p$ on the rim of wheel 18, as they were in FIG. 3. The operation just described thus substantially eliminates any false indication of relative longitudinal motion between pig 16 and pipe wall 10 due to a change in the spacing S therebetween.

Figure 8:
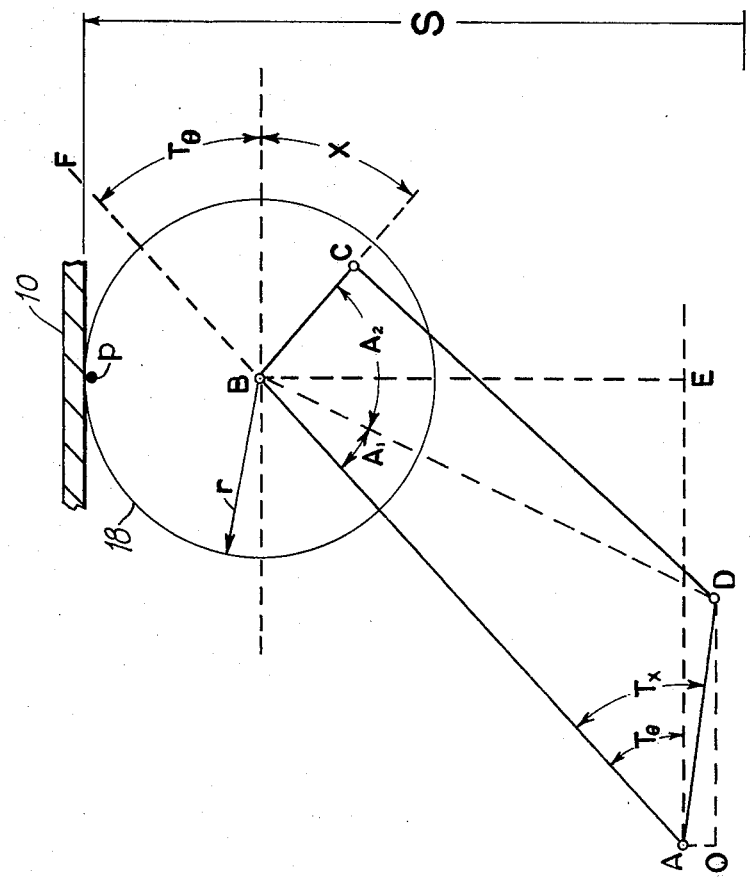
FIGS. 7 and 8 are diagrams referred to in explaining the construction and operation of the apparatus of this invention.
Figure 7:
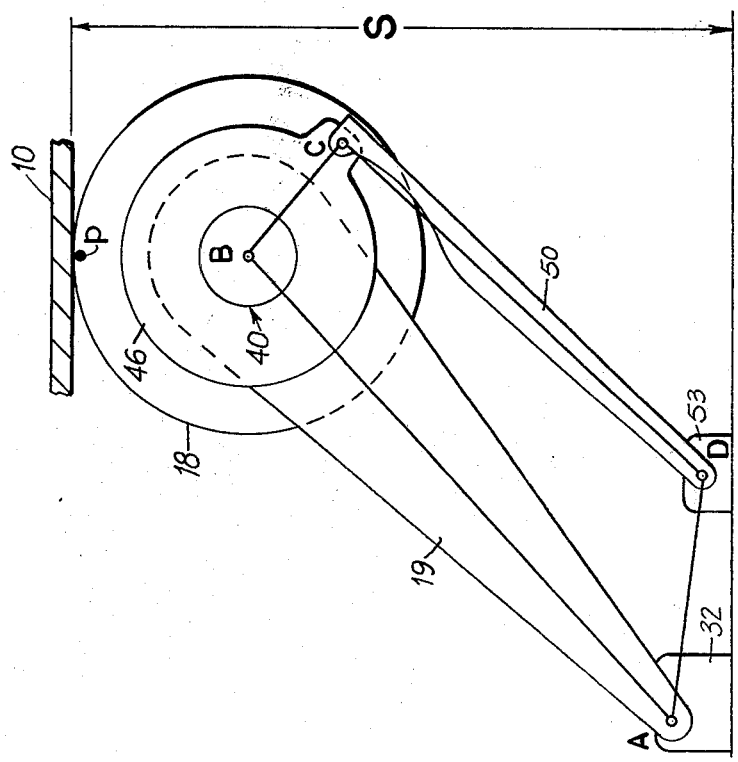

In analyzing the structure of the present invention it will be seen in FIGS. 7 and 8 that the mechanism may be considered to be a quadrangular shaped four bar pivotally connected linkage having the legs AB, BC, CD, DA. The design of the linkage to produce its desired compensating motion may proceed as follows. Assuming that the normal inclination of pivot arm 19, link AB, when the pig is centered in the pipeline will be the angle $T\theta$. As the pig moves off center, or if the wall 10 has a mash therein, the spacing S changes and arm AB changes to some different inclination $T\theta_1$. When $T\theta_1$ is less than $T\theta$ the point $p$ on wheel 18 rotates counterclockwise, as previously explained. To compensate the encoder readout for this rotation it will be necessary for the angle X to change so that the linkage arm BC rotates by the same amount in the counterclockwise direction. Correspondingly, when the angle $T\theta_1$ is larger than $T\theta$, wheel 18 will have rotated clockwise and linkage arm BC must rotate the same amount clockwise.

The angular rotation of the point $p$ as a function of the change in angle $T\theta$ is related to the change in the length of the leg AE of triangle AEB, FIG. 8. This rotation of point $p$ may be expressed in radians by the relationship $$\angle p = AB/r (\cos T\theta_1 - \cos T\theta) \tag{1}$$

where $r$ is the radius of wheel 18 and the other quantities are as defined above.

It now is desired to choose the parameters of the four bar linkage ABCDA so that for a change in inclination of pivot arm 19 from $T\theta$ to $T\theta_1$, the linkage BC (which in fact is the stator portion of the incremental shaft encoder) will rotate in the same direction as point $p$ by an angle equal to the value of equation (1). In FIG. 8, the angle X must change by a value substantially equal to the value of equation (1).

First, the angle X must be defined in terms of the known parameters $T\theta$ and the lengths of the linkages AB, BC, CD, OA and QD. The following development will provide the desired definition of angle X. The length AD is given by the Pythagorean relationship $$AD = \sqrt{OA^2 + OD^2}$$

The angle Tx is equal to the angle $T\theta$ plus the angle DAE, which may be expressed as follows, it being realized that angles DAE and ADO are equal, $$Tx = T\theta + \arctan OA/OD$$

Now the sides AB and AD and the included angle Tx of triangle BAD are known so that the side BD may be determined by the law of cosines as follows.

$$BD = \sqrt{AB^2 + AD^2 - 2(AB \times AD \times \cos Tx)}$$

Similarly, the angle $A_1$ may be expressed as follows.

$$A_1 = \arccos \left[ \frac{AB^2 + BD^2 - AD^2}{2(AB \times BD)} \right]$$

The three sides of triangle BCD are now known so that the angle $A_2$ may be expressed as follows.

$$A_2 = \arccos \left[ \frac{BD^2 + BC^2 - CD^2}{2(BC \times BD)} \right]$$

The line ABF is an angle of 180° which has the component angles $A_1$, $A_2$, X, and $T\theta$. X is the only unknown angle so that it may be expressed as follows.

$$\angle X = 180 - A_1 - A_2 - T\theta \tag{2}$$

In designing the apparatus of the present invention, a set of parameters is selected for the four bar linkage AB, BC, CD, DA, and with the use of equation (1) the angular rotation of wheel 18 (point $p$) is determined and plotted for a working range of angles $T\theta$, $T\theta_1$, $T\theta_2$, $T\theta_3 \ldots T\theta_n$. That is, for the angular range of movement of pivot arm 19 that is expected in an operating situation. With the same set of assumed parameters the changes in the value of angle X are determined from equation (2) and plotted throughout the angular range $T\theta$, $T\theta_1$, $T\theta_2$, $T\theta_3 \ldots T_n$. The resultant curves are compared to determine their correspondence, or lack of correspondence, over the working angular range of $T\theta \ldots T_n$. If the two curves do not match over the desired range, one or more parameters, such as the lengths BC, CD, OA, and OD are changed and the equations again are evaluated over the working range. By successive trial and error, a set of parameters is arrived at which will result in the two curves matching, or substantially matching, over the desired operating range. Of course, the time and effort involved in the above procedure may be considerably shortened and simplified by using a computer to run through the calculations for the working range of angles with various sets of assumed parameters and producing readouts which are a comparison of the two rotations.

From the above explanation it may be seen that error compensation for shaft encoder 40 is achieved by the use of a rotatable stator portion 42 and crank arm 50. Crank arm 50 provides an over-the-center type of crank motion so that upon a decrease in the angle $T\theta$ arm BC (stator portion 42) will be rotated counterclockwise when point $c$, FIG. 8, is on the right side of line DB and its extension through the circumference of wheel 18. Upon an increase in the angle $T\theta$, wheel 18 will rotate clockwise and the directions of rotation imparted to link BC will be just opposite to the directions described above. For the type of linkage illustrated in the drawings, the points C and D must each fall on the same side of the respective lines BD and BA. That is, in FIG. 8 points C and D both are to the right of a plane that includes the axis of rotation through point B and point A.

It is to be understood that other arrangements of linkages and couplings may be employed to produce the proper rotation of stator member 42 that will track or follow the rotation of point $p$ on wheel 18 as pivot arm 19 changes its inclination. As one example, the end region of crank arm 50 may be attached to the pig body 16, which may be considered a base for the linkage, by means of a sliding joint rather than a pivot joint. It further is to be understood that the rotation measuring device 40 might take some other form such as an angle measuring potentiometer which produces an output voltage whose magnitude is a function of the angular relationship between its rotor and stator portions.

What is claimed is:

1. In apparatus for measuring the relative translation between a base member and a surface wherein indication of translation is produced by a rotatable wheel and a measuring device having a rotor portion and a stator portion which are relatively movable about an axis, and wherein said wheel is supported against said surface by a pivot arm which is pivotally coupled at a first position on the base member and wherein the arm is inclined with respect to the surface and subject to a change in its angle of inclination when the lateral spacing between said surface and base member changes, thereby producing a rotation of said wheel and an erroneous indication of relative translation, the improvement for minimizing such an erroneous indication comprising means for mounting said measuring device on said apparatus and for coupling the rotor portion thereof to said wheel for rotating the rotor as a function of the rotation of the wheel, the stator portion of the measuring device being rotatable about said axis, a crank arm pivotally coupled to said stator at a location removed from said axis and pivotally coupled to a second position on said base member to provide a crank action to rotate said stator portion about said axis when the lateral spacing changes between said surface and base member, said pivot arm and said crank arm forming opposite sides of a quadrangular shaped four bar linkage, the portion of said stator between said axis and the pivotal coupling to said crank arm forming a third side of said linkage and the portion of said base member between said first and second positions comprising the forth side opposite to said third side, the lengths of said pivot arm and said crank arm and the coupling locations of said crank arm to said stator portion and to said base member being proportioned and arranged to make the rotation of the stator portion substantially equal in magnitude to the rotation of said wheel throughout a given range of angles of inclination of said pivot arm caused by changes in the spacing between said base member and said surface.

2. In a pipeline pig adapted to be propelled through a pipeline by the fluid being transported therethrough, and wherein said pig is comprised of a body member carrying instrumentation to measure the geometrical characteristics of the pipeline, and wherein the instrumention includes at least two rotatable wheels in rolling contact with the pipeline wall at angular spaced regions thereon and each wheel having associated therewith a measuring device having a rotor portion and a stator portion which are relatively rotatable about an axis, said wheels being held in contact with the pipe wall by respective support arms pivotally coupled to said body member at respective first positions, said support arms being inclined so that said wheels trail their respective first positions on said body member, said arms being subject to a change in their angles of inclination when the lateral spacing between said body member and pipeline wall changes, thereby producing a rotation of said wheels and an erroneous measurement by said measuring devices, the improvement for minimizing such an erroneous measurement comprising means for coupling the rotor portion of each measuring device to a respective rotatable wheel to cause each rotor portion to rotate with its respective wheel, each said stator portion being movable with its respective support arm when the angle of inclination of the arm changes but each stator portion being free to rotate about its axis and relative to its respective support arm, a crank arm associated with each stator portion for rotating its stator portion as the angle of inclination of the respective support arm changes, each crank arm being pivotally coupled at one end to its respective stator portion at a location removed from the axis of rotation of the stator portion and movably coupled at its other end at a respective second position on the body member, each second position on said body member being removed from its respective first position in the direction opposite to the intended direction of motion of said pig through the pipeline, said support arm and crank arm associated with each wheel comprising opposite sides of a quadrangular shaped four bar linkage, the other two sides of the quadrangular shape being comprised of the portion of the respective stator portion between its axis of rotation and its pivotal coupling to the crank arm and the portion of the body member between the respective first and second positions, each four bar linkage being so proportioned and arranged to rotate its respective stator portion about its axis by an angle substantially equal in magnitude and direction to the angular rotation of the respective wheel when the lateral spacing changes between the pig and pipeline wall.

3. The combination claimed in claim 2 wherein in each four bar linkage the pivotal coupling of the stator portion to the crank arm and the movable coupling of the crank arm to the body member both are removed from the support arm in the direction opposite to the direction of intended motion of the pig through the pipeline.

4. The combination claimed in claim 2 wherein each measuring device is an incremental shaft encoder whose rotor portion is directly coupled to its respective rotatable wheel.

5. In apparatus for measuring the relative translation between a base member and a surface wherein indication of translation is produced by a rotatable wheel and a measuring device having a rotor portion and a stator portion which are relatively movable about an axis, and wherein said wheel is supported against said surface by a pivot arm which is pivotally coupled at a first position on the base member and wherein the arm is inclined with respect to the surface and subject to a change in its angle of inclination when the lateral spacing between said surface and base member changes, thereby producing a rotation of said wheel and an erroneous indication of relative translation, the improvement for minimizing such an erroneous indication comprising:

means for mounting said measuring device on said apparatus and for coupling the rotor portion thereof to said wheel for rotating the rotor as a function of the rotation of the wheel, the stator portion of the measuring device being rotatable about said axis, a crank arm pivotally coupled to said stator at a location removed from said axis and pivotally coupled to a second position on said base member to provide a crank action to rotate said stator portion about said axis when the lateral spacing changes between said surface and base member.

6. In apparatus for measuring the translation of one member relative to a laterally spaced second member by means of a rotatable member and a measuring device having a movable portion and a stator portion and wherein said rotatable member is supported for rotation on said second member by a support member attached to said one member, said support member being inclined with respect to the second member and subject to change in its angle of inclination due to a change in lateral spacing between said one and second members, thereby causing the rotatable member to rotate and produce an erroneous indication of relative translation, the improvement comprising, means for moving the movable portion of the measuring device as a function of the relative translation of said one and second members, said stator portion of the measuring device being disposed for movement with said support member as the support member changes its angle of inclination and disposed for additional movement relative to both the support member and the rotatable member, crank means having one region thereof coupled to said stator portion and having another region coupled to said one member, said crank means being movable relative to said one member and relative to said stator portion, said support member, said crank means, said stator portion and said one member being constructed and arranged to comprise a multiple bar linkage in which the crank means moves the stator portion by an amount and in the direction to compensate the measuring device for the rotation of the rotatable member when said spacing changes between said one and second members.

7. The combination claimed in claim 6 wherein the couplings of the crank means to said stator portion and to said one member are on the same side of first and second respective planes, the first one of which contains the axis of rotation of the rotatable member and the coupling of the crank means to said one member, and the second plane containing the axis of rotation of the rotatable member and the position where the support member is attached to said one member.

8. The combination claimed in claim 6 wherein said one and another regions of said crank means are located on the same side of a plane that includes the axis of rotation of the rotatable member and the place of attachment of the support member to said one member.

9. The combination in claim 8 wherein said measuring device is a rotation sensing device whose movable portion rotates relative to its stator portion and said stator portion is rotatable relative to said support member, and wherein said crank means is so constructed and arranged and so coupled to the stator portion and to the one member to provide a crank action to rotate said stator portion by substantially the same angle and in the same direction as the rotation of the rotatable member when the spacing changes between said one and second members.

10. In apparatus for measuring the translation of a base member along a laterally spaced surface by means of a rotatable member and a measuring device having a rotor portion and a stator portion which are relatively rotatable about an axis, and wherein said rotatable member is supported for rotation on said surface by a support member which is attached to the base member, said support member being inclined with respect to said surface and subject to change in its angle of inclination relative to said surface as the spacing changes between the base member and surface, thereby causing the rotatable member to rotate and the measuring device to produce an erroneous indication of translation of the base member along the surface, the improvement comprising:

means for rotating the rotor portion of the measuring device as a function of the translation of said base member and surface, said stator portion being disposed for movement with said support member as the support member changes its angle of inclination and further being rotatable about said axis relative to said support member, crank means having one region thereof coupled to said stator portion at a location removed from said axis and having another region coupled to said base member, the one region and another region where the crank means is coupled to the stator portion and base member both being on the same side of respective first and second planes, the first plane containing the axis of rotation of the rotatable member and said another region of the crank member, said second plane containing the axis of rotation of the rotatable member and the position where the support member is attached to said base member.

* * * * *